Patented Sept. 15, 1953

2,652,413

UNITED STATES PATENT OFFICE 2,652,413

PROCESS FOR PREPARING ALKANOIC ACIDS

Robert W. Rosenthal, Poughkeepsie, N. Y., assignor to The Texas Company, New York, N. Y., a corporation of Delaware No Drawing. Application November 7, 1950, Serial No. 194,567

8 Claims. (Cl. 260—413)

This invention relates to a process for preparing organic alkanoic acids by the reaction of olefins with carbon monoxide and water. More specifically, this invention discloses a process for preparing alpha-methyl alkanoic acids.

In accordance with the process of this invention, alpha-methyl alkanoic acids are prepared by reacting an olefin with carbon monoxide and water at a temperature of 500 to 700° F. and at a pressure of 1000 to 5000 pounds per square inch gauge in the presence of a catalyst comprising nickel carbonyl, nickel halide and hydrochloric acid. This invention is specifically concerned with the discovery that hydrochloric acid-promoted nickel carbonyl-nickel halide catalysts are superior catalysts for production of organic acids from olefins by the carbonylation reaction. Excellent yields of alpha-methyl alkanoic acids are obtained in the process of this invention employing a hydrochloric acid-promoted nickel carbonyl-nickel halide catalyst.

The prior art teaches that olefins can be converted to organic acids by reaction with carbon monoxide and water at elevated temperatures and pressures over 1000 pounds per square inch gauge in the presence of nickel carbonyl-nickel halide catalyst. It is also known in the art to carbonylate olefins to organic acids in the presence of a catalyst comprising nickel carbonyl and acetic acid. A catalyst comprising nickel carbonyl and active carbon is also disclosed to be effective for the conversion of olefins to organic acids by reaction with carbon monoxide and water. This invention involves the discovery that the production of organic acids by reaction of olefins and carbon monoxide and water is particularly effective employing a catalyst comprising nickel carbonyl, nickel halide and hydrochloric acid. Conversions employing the hydrochloric acid-promoted nickel carbonyl-nickel halide catalyst of this invention result in significantly higher yields of alpha-methyl alkanoic acids than are obtained with previously known catalysts.

The carbonylation process of this invention is applicable to aliphatic olefins containing 2 to 30 carbon atoms. Apparently the chain length of the olefins is not critical in determining whether the acid-forming reaction of this invention takes place. The preferred charge materials are $C_2$ to $C_{16}$ olefins.

The reaction mixture ordinarily contains a substantial excess of the water and carbon monoxide reactants. Preferred reaction mixtures comprise 1 mol of olefin, 2 to 6 mols of water and 2 to 10 mols of carbon monoxide. It is stressed, however, that the novel carbonylation catalyst of this invention is useful for all ratios of olefins with carbon monoxide and water in the production of alpha-methyl alkanoic acids.

The novel carbonylation catalyst for the production of alpha-methyl alkanoic acids by the reaction of olefins with carbon monoxide and water comprises approximately 50 to 95 per cent nickel carbonyl, 1 to 25 per cent nickel halide and 4 to 25 per cent hydrochloric acid. It is apparent that the composition of a catalyst can be varied within wide limits and still result in the formation of good yields of alkanoic acids. A particularly preferred catalyst comprises approximately 65 per cent nickel carbonyl, 10 per cent nickel halide and 25 per cent hydrochloric acid.

Nickel chloride and nickel iodide are the preferred nickel halides employed in the novel carbonylation catalysts of this invention. Other nickel halides such as nickel bromide and nickel fluoride may also be employed, but optimum results are obtained with nickel chloride and nickel iodide.

Hydrochloric acid employed in the catalyst compositions of this invention is ordinarily concentrated hydrochloric acid in which the hydrochloric weight concentration is approximately 36 per cent. It is possible to use more dilute hydrochloric acid but it is recommended that the hydrochloric acid employed in preparation of the catalyst contain at least 20 weight per cent hydrogen chloride.

The conversion of olefins, carbon monoxide and water to alpha-methyl alkanoic acids in accordance with the process of this invention employing novel carbonylation catalyst comprising nickel carbonyl, nickel halide and hydrochloric acid is not effected at conventional conditions for production of organic acids from olefins by the carbonylation reaction. Temperatures of 500 to 700° F. and pressures of 1000 to 5000 per square inch are employed. Preferred temperature and pressure conditions are in the range of 550 to 625° F. and 3500 to 4800 pounds per square inch gauge.

The excellent results obtained in the production of alpha-methyl alkanoic acids from olefins, carbon monoxide and water employing the novel catalyst of this invention are illustrated in the following example:

250 cc. of octylene-1 and 80 g. of water were charged to a stainless steel reaction vessel fitted with a mechanical stirrer. A novel carbonylation catalyst comprising 98 g. of nickel carbonyl, 15 g. of nickel chloride and 30 g. of concentrated hydrochloric acid was also charged to the reaction vessel. Carbon monoxide was charged to the reaction vessel which was then raised to a temperature of approximately 575° F. and to a pressure of about 4500 pounds per square inch gauge. During the reaction the pressure in the reaction vessel was maintained at about 4500 pounds per square inch gauge by intermittent charging with carbon monoxide. After the reaction period of 17 hours there was obtained 284 g. of reaction product from which there was isolated 77 g. of 2-methyl octanoic acid, which is a yield of 33 per cent basis olefin charged.

When octylene was reacted with carbon monoxide and water under similar temperature and pressure conditions employing a nickel carbonyl-nickel chloride catalyst which was not promoted with hydrochloric acid, an insignificant yield of octanoic acid was obtained.

It is apparent that the hydrochloric acid-promoted nickel carbonyl-nickel halide catalyst of this invention results in substantially superior yields of alpha-methyl alkanoic acids by the reaction of olefins, carbon monoxide and water. The hydrochloric acid-promoted nickel carbonyl-nickel halide catalyst of this invention is a significant advance in the carbonylation catalyst field since it permits production of organic acids in good yield from olefins by a one-step process.

Obviously, many modifications and variations of the invention as hereinbefore set forth may be made without departing from the spirit and scope thereof and, therefore, only such limitations should be imposed as are indicated in the appended claims.

I claim:

1. A process for preparing alpha-methyl alkanoic acids which comprises reacting olefins with carbon monoxide and water in the presence of a catalyst comprising 50 to 95 per cent nickel carbonyl, 1 to 25 per cent nickel halide and 4 to 25 per cent hydrochloric acid containing at least 20 weight per cent hydrogen chloride at a temperature of 500 to 700° F. and at a pressure of 1000 to 5000 pounds per square inch gauge.

2. A process according to claim 1 in which the catalyst comprises 65 per cent nickel carbonyl, 10 per cent nickel chloride, and 25 per cent hydrochloric acid.

3. A process according to claim 1 in which the reaction is effected at temperatures of 550 to 625° F. and a pressure of 3500 to 4800 per square inch.

4. A novel carbonylation catalyst for the conversion of olefins with carbon monoxide to alpha-methyl alkanoic acids which comprises 50 to 95 per cent nickel carbonyl, 1 to 25 per cent nickel halide and 4 to 25 per cent hydrochloric acid containing at least 20 weight per cent hydrogen chlorides.

5. A catalyst of the type described in claim 4 in which nickel chloride is employed.

6. A catalyst of the type described in claim 4 in which nickel iodide is employed.

7. A process according to claim 1 in which the catalyst contains concentrated hydrochloric acid of approximately 36 weight per cent hydrogen chloride.

8. A catalyst of the type described in claim 4 comprising 65 per cent nickel carbonyl, 10 per cent nickel chloride and 25 per cent hydrochloric acid.

ROBERT W. ROSENTHAL.

References Cited in the file of this patent

UNITED STATES PATENTS

| Number | Name | Date |
| --- | --- | --- |
| 1,924,767 | Carpenter | Aug. 29, 1933 |
| 1,973,662 | Schalch | Sept. 11, 1934 |
| 2,328,275 | Heard | Aug. 31, 1943 |
| 2,406,869 | Upham | Sept. 31, 1946 |
| 2,448,368 | Gresham et al. | Aug. 31, 1948 |
| 2,448,375 | Larson | Aug. 31, 1948 |
| 2,510,105 | Hedberg | June 6, 1950 |

FOREIGN PATENTS

| Number | Country | Date |
| --- | --- | --- |
| 621,520 | Great Britain | Apr. 11, 1949 |

OTHER REFERENCES

Peck et al., "Interview With Dr. J. W. Reppe," Fiat Final Report No. 273, pp. 8–12 (1945).

Reppe, "Advances in Acetylene Chem." P. B. No. 1112, pp. 19–23, published January 25, 1946.